United States Patent [19]

Budaker et al.

[11] Patent Number: 5,450,916
[45] Date of Patent: Sep. 19, 1995

[54] POWER-ASSISTED STEERING DEVICE

[75] Inventors: Martin Budaker, Heubach; Gerhard Hägele, Hohenstadt; Willi Nagel, Schwäbisch Gmünd, all of Germany

[73] Assignee: ZF Friedrichshafen, AG, Friedrichshafen, Germany

[21] Appl. No.: 256,538

[22] PCT Filed: Jan. 26, 1993

[86] PCT No.: PCT/EP93/00167
§ 371 Date: Jul. 13, 1994
§ 102(e) Date: Jul. 13, 1994

[87] PCT Pub. No.: WO93/14966
PCT Pub. Date: Aug. 5, 1993

[30] Foreign Application Priority Data

Jan. 27, 1992 [DE] Germany .................. 42 02 116.2

[51] Int. Cl.6 .................... B62D 5/04; F16D 43/02
[52] U.S. Cl. .................. 180/79.1; 60/384; 180/132; 180/149
[58] Field of Search ............. 180/132, 141, 149, 79.1; 60/384

[56] References Cited

U.S. PATENT DOCUMENTS 3,584,985 6/1971 Vagn Baatrup .................. 180/149
4,241,804 12/1980 Deininger et al. ................ 180/79.1
5,042,250 8/1991 Carlson et al. ................... 180/132

FOREIGN PATENT DOCUMENTS

276460 2/1990 German Dem. Rep. .......... 180/149
2746919 4/1979 Germany .
249763 10/1990 Japan ............................. 180/149
2224704 5/1980 United Kingdom .............. 180/149
WO91/05692 5/1991 WIPO .

Primary Examiner—Mitchell J. Hill
Attorney, Agent, or Firm—Albert M. Zalkind

[57] ABSTRACT

An auxiliary power source, for example, an electric motor, supplies the power assist for a steering unit via a worm gear (15, 16). The worm gear (15, 16) drives clutch hubs (22 and 23) in the opposite rotational directions. The auxiliary power can be transferred to a driven shaft (3) via a common clamping sleeve (27) that can be expanded polygonally by two rows of clamping bodies (28 and 30) into one or the other clutch hubs (22 or 23). The clamping sleeve (27) is slitted into functional segments (A and B). Depending on the direction of rotation of the steering spindle (1), one or the other functional segments (A or B) of the clamping sleeve (27) is always active. The clutch units (2) run in a lubricant so that there is little wear and tear. This steering system can be made at reasonable cost and takes little space for installation.

17 Claims, 7 Drawing Sheets

POWER-ASSISTED STEERING DEVICE

This invention relates to an auxiliary power steering unit for motor vehicles consisting of a steering spindle—that can be driven by a steering hand wheel—with a steering gear. The auxiliary power acts as a torque for each turning direction, separated for one clutch unit at a time. Via reducing gears, the clutch units establish a drive connection from an auxiliary drive source that rotates only in one direction to a driven shaft that drives into the steering gear.

An auxiliary power steering of the design described above is known, for example, from DE 2746919A1. Here, an electric motor acts upon a conical pinion via a worm wheel and a free-wheel. The conical pinion drives two conical wheels in opposite directions and these wheels in each case are connected to clutch drums. Furthermore, there are provided clutch cheeks that cooperate with the clutch drums and that are connected to the steering spindles; when a rotary movement is initiated on the manual steering wheel which, upon initiation of a rotary movement on the manual steering wheel, press a pair of cheeks into the clutch drum that is driven in the same direction of rotation. In this way, one can support the manual rotary movement by means of the electric motor; in the process, the height of the support is proportional to the steering resistance that acts upon the steered wheels.

Considerable friction value fluctuations can occur during dry-runs along the clutch elements that work with friction coatings, so that under certain circumstances, the steering behavior will be influenced differently in the steering directions. Besides, with the lever ratios of the clutch cheeks provided, the setting ranges are comparatively long which, in turn, results in a delayed response behavior. One gets a comparatively large installation space by virtue of the complicated design of the clutch elements radially with respect to the steering spindle. Finally, one uses a comparatively expensive torsion bar in order to get a softly turning connection of the two steering spindle parts.

The purpose of the invention is to find a reasonably priced, electrically supported steering system where the auxiliary force is supplied uniformly without delay as a function of the supplied manual force. Another requirement is to house the steering system also in tight spaces.

The invention consists in the fact that clamping bodies guided in a common cage and acting in both directions of rotation are provided and that the clamping bodies act upon a common clamping sleeve that is subdivided into functional segments and that is slitted. The clamping sleeve rests with a small interval inside two clutch hubs that are driven in different directions of rotation by the reducing gear. The clutch unit gear works in such a way that—in case of a steering movement—as a function of the steering torque on the manual steering wheel, there will—by virtue of the clamping body—be a polygonal spreading of one of the two functional segments of the clamping sleeve against one or the other clutch hub. This spreading can be achieved by means of clamping slopes on the inside diameter of the clamping sleeve on which the clamping bodies run up. The clamping sleeve transmits the auxiliary torque, for example, of an electric motor upon the driven shaft in both directions of rotation.

The steering unit according to the invention works with small setting ranges so that the auxiliary torque can, without response delay, be fed into the driven [shaft] portion of the steering spindle. One gets uniform friction forces with minimum wear and tear because the clutch unit runs in a lubricating agent. Moreover, by means of the space-saving design of the clutch elements, one can achieve a rather cramped outer shape so that the steering system can also be used in smaller vehicles.

The invention is not confined to the combinations of features given in the claims. The experts will find additional meaningful possibilities of combining claims and individual claim features from the problem statement.

The invention will now be explained in greater detail with the help of the drawing showing practical examples.

The basic idea behind the invention is—by means of clamping bodies grouped around the steering spindle—depending on the direction of rotation, to couple two mutually independent clutch hubs with a clamping sleeve which works in both directions of rotation. The clamping sleeve, in other words, establishes a connection via the clutch hubs from a drive source that supplies the auxiliary power to the steering gear.

Figure 1:
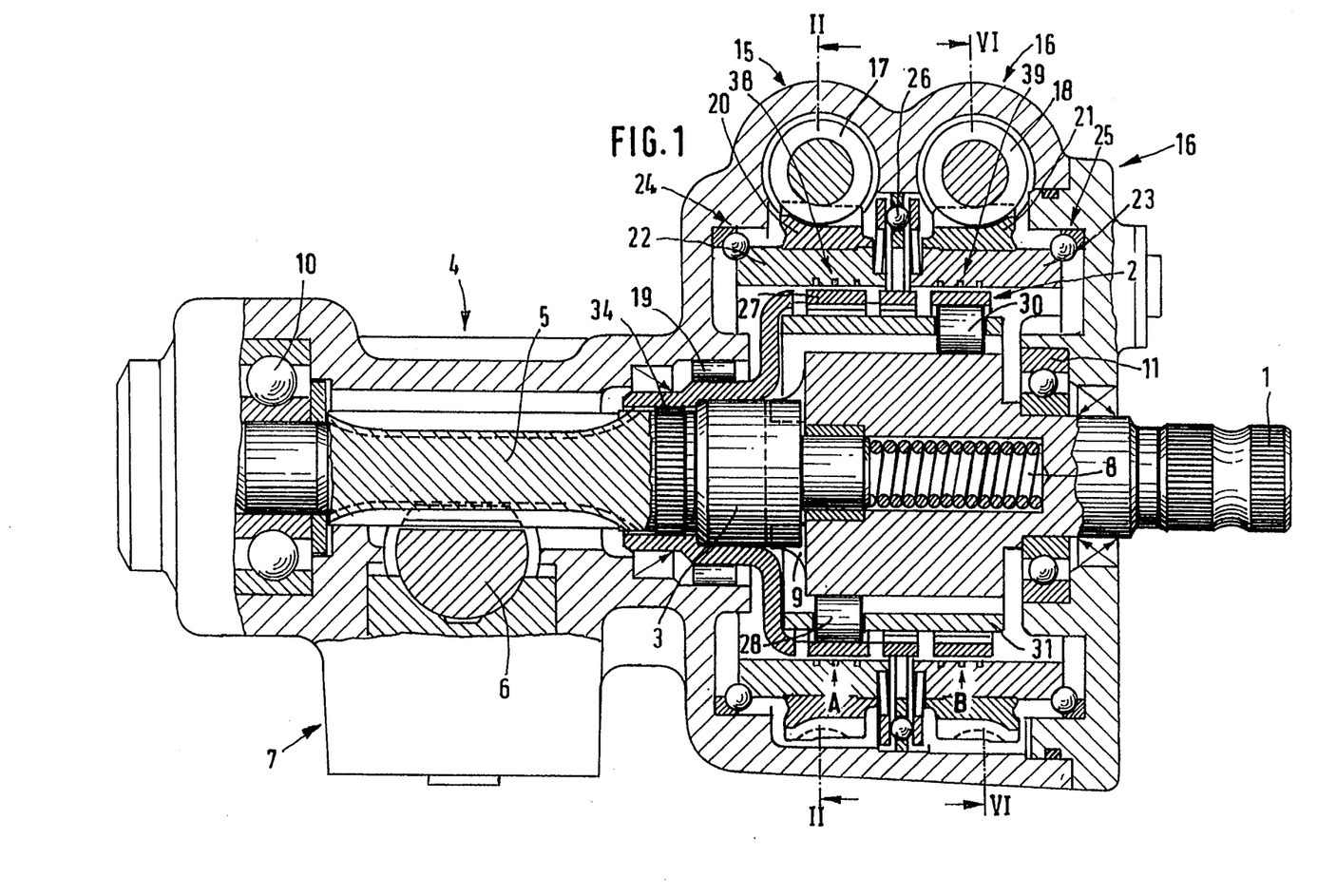
FIG. 1 is a longitudinal profile through an electrical auxiliary power steering [unit] with manual selection [drive] where the auxiliary unit is integrated into the steering [unit]

In FIG. 1, a steering spindle 1 connected with a manual steering wheel not shown in the drawing is connected via clutch units 2 with a driven shaft 3. Driven shaft 3 is a part of a steering gear 4—in this particular case, a steering rack gear consisting of a pinion 5, a steering rack 6, and a press-on device 7. A spring 8 sits between steering spindle 1 and driven shaft 3 for axial play equalization. The axial forces can thus be absorbed in roller bearings 10 and 11 that simultaneously radially support pinion 5 or steering spindle 1. Another radial roller bearing 19 supports the driven shaft 3 that is firmly connected with pinion 5 and the steering spindle 1 that is positioned on driven shaft 3. In a thickened portion of steering spindle 1, there are recesses 9 that engage catches on driven shaft 3 with a certain twisting play. Spring 8 allows this kind of twisting or steering play, but in the process, it is slightly twisted within itself.

Figure 2:
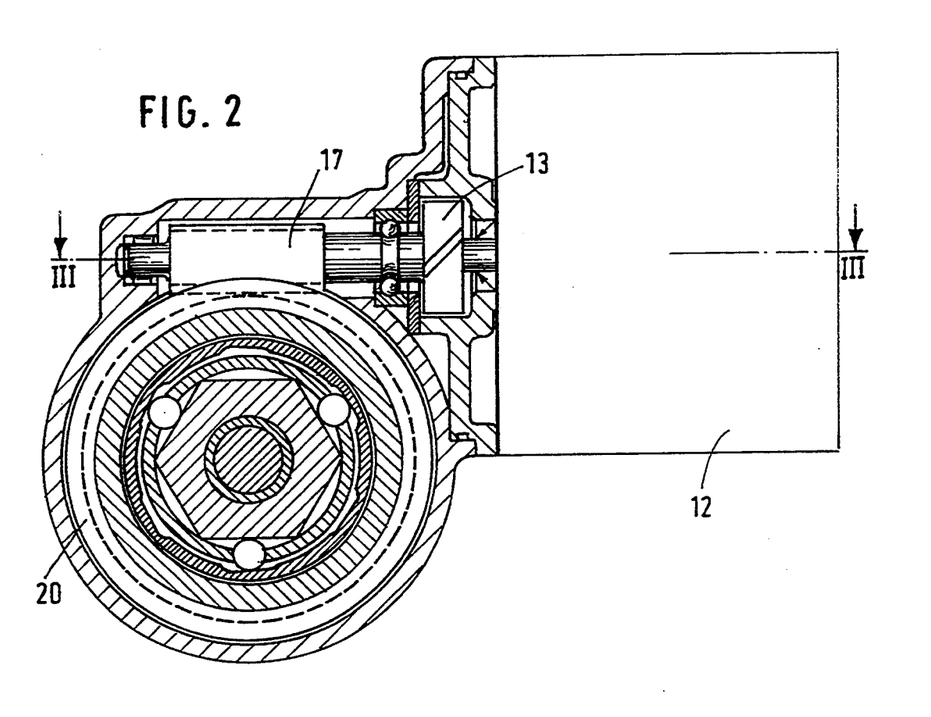
FIG. 2 is a reduced-size lateral profile along line II—II in FIG. 1.
Figure 3:
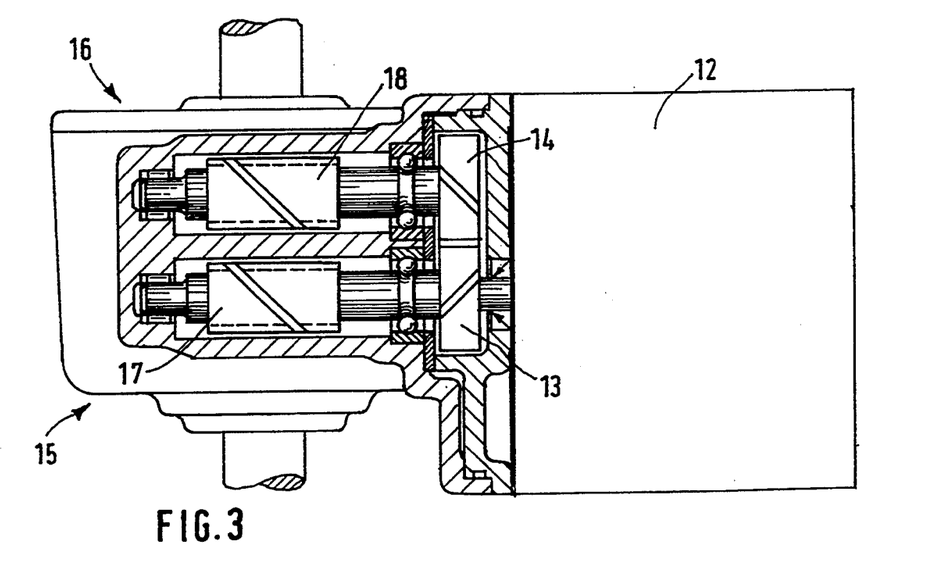
FIG. 3 is a reduced-size lateral profile along line III—III in FIG. 2.
Figure 5:
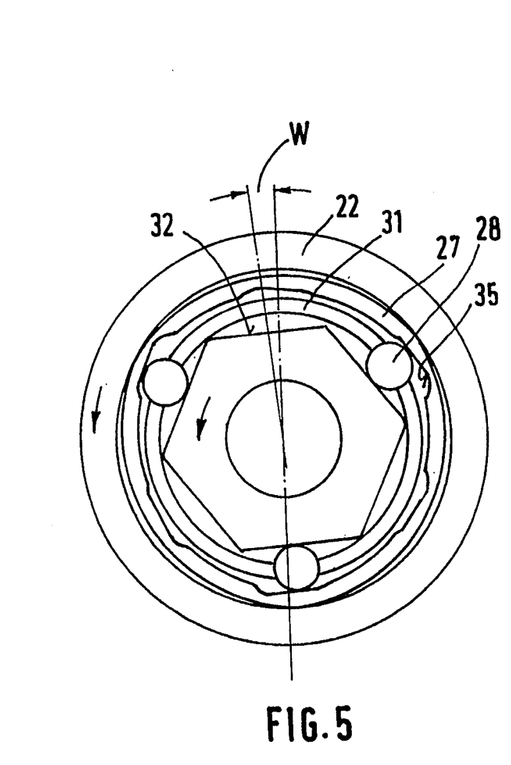
FIG. 5 is an enlarged partial profile of one of the clutch units corresponding to FIG. 2 when steering to the left.
Figure 6:
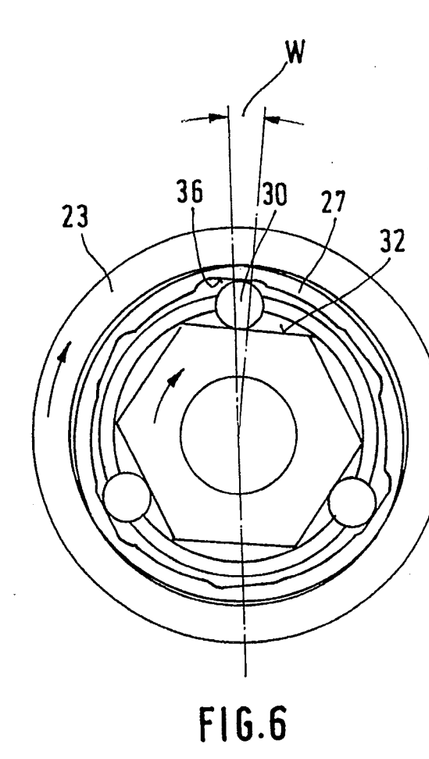
FIG. 6 is an enlarged partial profile of the other clutch unit corresponding to line VI—VI in FIG. 1 when steering to the right.
Figures 7, 8, 9, 10, 11, 12:
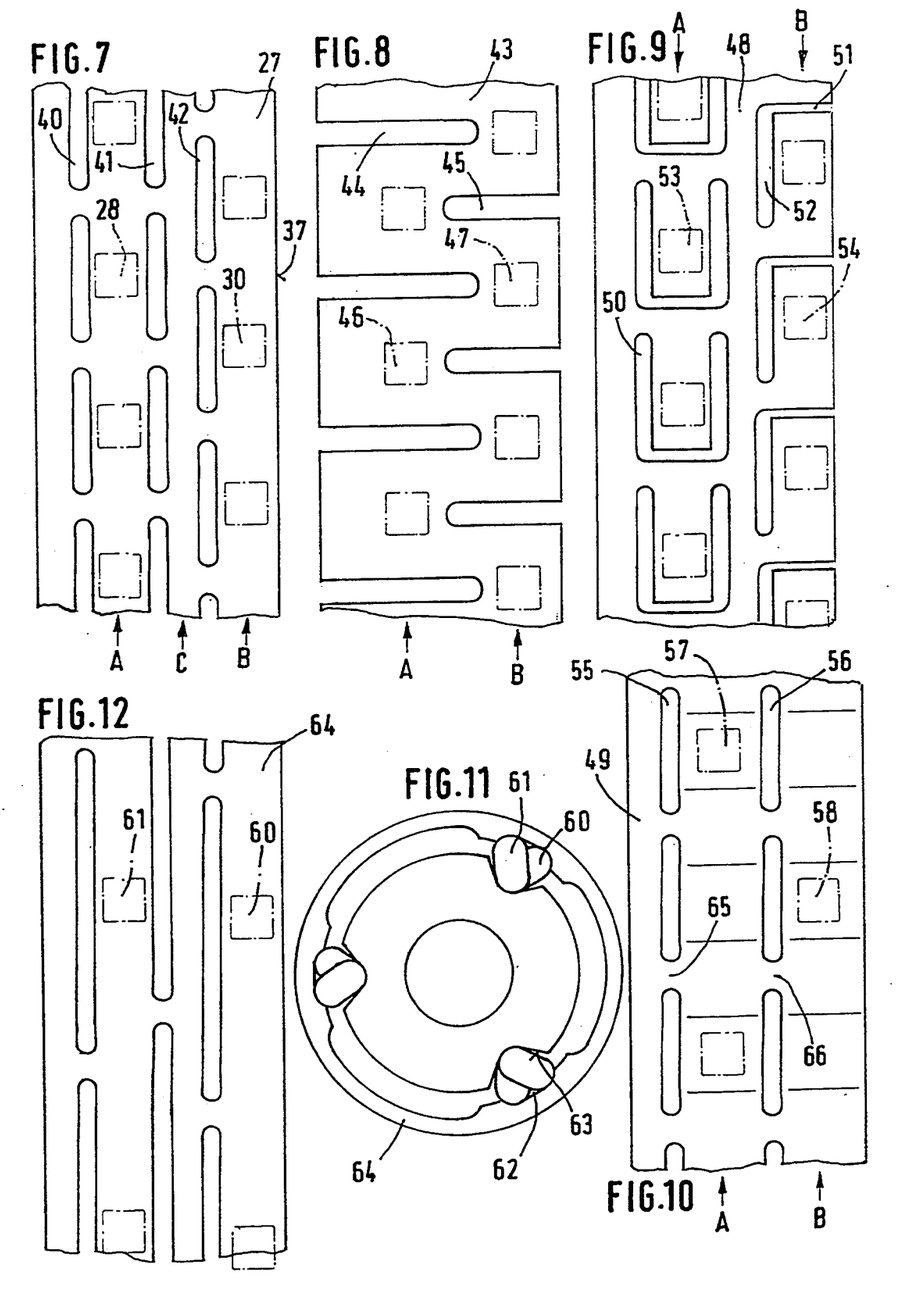
FIGS. 7 to 10 show various models of the clamping sleeve in partial developed views.
FIG. 11 is another model of a clutch unit.
FIG. 12 shows a partial developed view of the clamping sleeve belonging to the clutch unit according to FIG. 11.

According to FIGS. 2 and 3, a drive source that supplies the auxiliary power—for example, an electric motor 12—via a spur pinion pair 13 and 14 drives two worm gears 15 and 16 in a counter-rotating manner. Each worm gear consists of a pinion 17 or 18 that engages a wheel 20 or 21. Each wheel 20 and 21 is connected with a clutch hub 22 or 23 (FIG. 1). Clutch hubs 22 and 23 are supported on oblique bearings 24 and 25. Between the two clutch hubs 22 and there is a so-called expansion bearing 26 that provides for the clutch hubs to come to rest axially in the oblique bearings 24 and 25 without any play. The clutch units that are separated for each direction of steering, in addition to clutch hubs 22 and 23, consist of a clamping sleeve 27 that is subdivided into two functional segments A and B, two rows of clamping bodies 28 and 30, a common cage 31, as well as several running surfaces 32 for the clamping bodies (FIGS. 5 to 7). In the practical example at hand, the thickened part of steering spindle 1 has a hexagonal profile whose surfaces are used as running surfaces 32. Clamping bodies 28 and 30 are held in a common cage 31. Clamping sleeve 27 grasps the two rows of clamping bodies 28 and 30 in a bell-shaped manner. A play "S" (FIG. 4) remains between clamping sleeve 27 and the two clutch hubs 22 and 23. Clamping sleeve 27 is practicably attached to the driven shaft 3 by means of a groove toothing 34. Clamping sleeve 27 can also be made as a cylindrical component without the bell-like attachment. In this case, one provides a correspondingly large collar on driven shaft 3 that can be flange-mounted on the cylindrical component (clamping sleeve 27).

The functional segments A and B of the clamping sleeve 27 have clamping slopes 35 and 36 that are attached in opposite directions. The inclination angle of the clamping slopes 35 with the pertinent clamping bodies 28 can be seen in FIG. 5 for a steering deflection to the left and the inclination angle of the clamping slopes for clamping bodies 30 can be seen from FIG. 6 for a steering deflection to the right.

If one fills an installation space of the clutch devices 2 with a lubricant, then one gets a low-wear force transmission. As one can see in FIG. 1, it is advantageous to work lubricating grooves 38 or 39 into the clutch hubs 22 and 23 in the area of functional segments A and B of the clamping sleeve 27. These lubricating grooves take care of a rapid displacement of the existing lubricating agent wedge. In this way, one gets a higher friction value and the auxiliary torque is supplied uniformly.

FIG. 7 shows the clamping sleeve 27 according to FIG. 1 in the developed view. Distributed over the circumference, clamping sleeve 27 has three rows of slits 40, 41 and 42. Slits 40 and 41 lie on the same level whereas slits 42 are arranged staggered with respect to the above-mentioned slits. Slits 40 and 41 enclose functional segment A between them, whereas slits 42 and an outer rim 37 of the clamping sleeve form the functional segment B. There is a neutral zone C between the two closely adjacent slits 41 and 42. Slit rows 40, 41 and 42 are so positioned with respect to each other that the functional segments A and B are uncoupled from each other in a radial direction by a polygonal deformation although they are rigidly connected with each other in the circumferential, direction. Clamping bodies 28 lie in the middle of slits 40 and 41 and clamping bodies 30 lie staggered with respect to clamping bodies 28 between slits 42 and rim 37. Clamping bodies 28 and 30 run in the inside diameter of clamping sleeve 27 in the corresponding clamping slopes 35 or 36.

Figure 4:
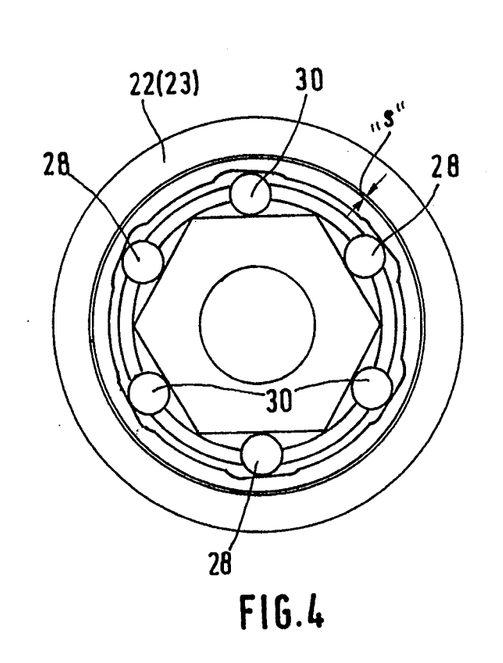
FIG. 4 is an enlarged partial profile in which the clutch units are drawn for left-hand and right-hand driving in an imaginary common drawing plane in the straight-ahead running position.

The auxiliary power steering unit works as follows:

FIG. 4 shows the position for straight-ahead running. Here, clamping bodies 28 and 30—which are illustrated in the same plane of drawing—are in their neutral middle position. Clamping sleeve 27 here maintains the play labeled "S" along its entire circumference with respect to the two clutch hubs 22 and 23. Accordingly, there cannot be a power transmission from clamping sleeve 27 to one of the two clutch hubs 22 or 23.

If the driver supplies a torque into the steering spindle 1 by turning to the left on the manual steering wheel according to FIG. 5, then the running surfaces 32 of steering spindle 1 will be pointing in the direction of the arrow. Clamping bodies 28 are pressed into clamping slopes 35 covering a steering path [distance] "W." The functional section of clamping sleeve 27 that is labeled A here spreads over the clamping body 28. In the process, clamping sleeve 27 is pressed into the clutch hub 22 that is driven in the corresponding direction of rotation by electric motor 12. The auxiliary power can thus be supplied via clamping sleeve 27 into driven shaft 3 and via steering gear 4 into the steered wheels. In this process, one must keep in mind that only functional segment A of clamping sleeve 27 is active. From neutral zone C onward, there is no further deformation; instead, the latter gets its play "S" with relation to clutch hub 23 on account of the special arrangement of slits 40, 41, 42. If the driver no longer exerts any steering force, then clamping bodies 28 roll back into their middle position (FIG. 4), that is to say, the steering again moves in the neutral position. Clamping bodies 28 thus assume the function of an otherwise customary torsion bar.

When the manual steering wheel is turned to the right, clamping sleeve 27 is polygonally expanded in its functional segment B into the clutch hub 23 by virtue of the active clamping bodies 30; this can be seen in greater detail in FIG. 6. Because the worm gear 16 drives clutch hub 23 in the opposite direction, clamping sleeve 27 together with drive shaft 3 will turn in the direction indicated by the arrows.

If electric motor 12 should fail due to trouble, it can be uncoupled from the steering train with the help of a free-wheel that is not visible. In that case, the driver must not turn the electric motor along with a steering motion with any increased force expenditure. The entire torque is transmitted from the steering spindle 1 to driven shaft 3 after overcoming the twisting play created by catches 9.

The version of a clamping sleeve 43 according to FIG. 8 shows two rows of slits 44 and 45 that are distributed over the circumference and that are staggered with each other and that are directed axially and that again form functional segments A and B. Here, clamping bodies 46 and 47 lie in the extension to slits 44 and 45.

In another design of a clamping sleeve 48 according to FIG. 9, U-shaped slits 50 and L-shaped slits 52, whose short legs 51 point outward, are associated with functional segments A and B. Clamping bodies 53 of functional segment A lie within the U-shape and clamping bodies 54 of functional segment B lie inside the L-shape.

In another version according to FIG. 10, one uses a clamping sleeve 49 with two rows of slits 55 and 56 that are aligned with respect to each other in the circumferential direction. Here, clamping bodies 57 of functional segment A lie between every other pair of slits 55 and 56 that are aligned toward each other. Here, connecting bars 65 and 66 lie between functional segments A and B in a neutral widening zone, that is to say, in the area in which clamping sleeve 49 is not radially deformed.

Clamping bodies 58 of functional segment B lie, staggered with respect to clamping bodies 57, between one rim of clamping sleeve 49 and the row of slits 56 that roughly lies in the middle.

Figure 13:
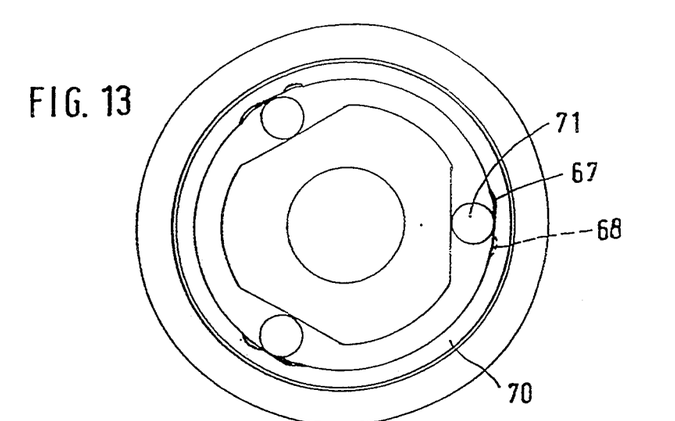
FIG. 13 is a version of a clutch unit with only one row of clutch bodies.
Figure 14:
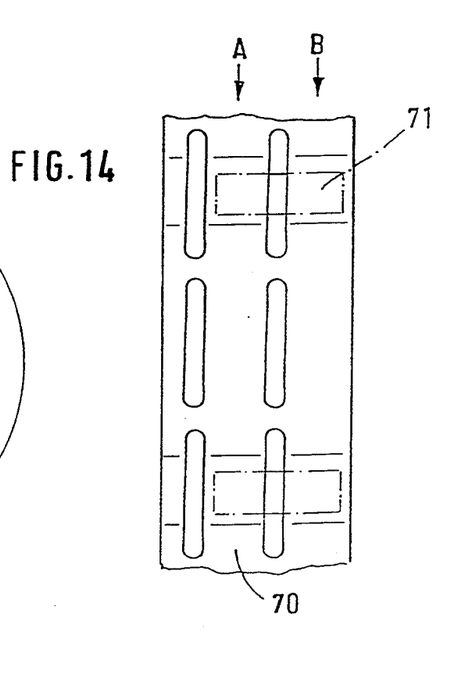
FIG. 14 is a partial developed view of the pertinent clamping sleeve.

The design according to FIGS. 11 and 12 shows clamping bodies 60 and 61 in the shape of crowned clamping plates. These clamping bodies 60, 61 are supported between two common grooves 63 of the steering spindle and impressions 62 on the inside of clamping sleeve 64. Clamping bodies 60 or 61 are positioned obliquely against their particular direction of action and are erected during steering. In the process, clamping sleeve 27 as in the previously discussed versions is tightened in the associated clutch hub in a point-shaped manner. Naturally, it is also possible to change the bracing support for clamping bodies 60 and 61 in such a way that grooves 63 will lie in clamping sleeve 64 and that the impressions will lie in the steering spindle, FIGS. 13 and 14 finally shows a version with a clamping sleeve 70 that in its two functional segments A and B reveals clamping slopes 67 or 68 that are inclined opposite to each other. These clamping slopes 67 and 68 cooperate only with one row of clamping bodies 71 that however reveal a greater length and that thus reveal two working areas whose function is separated. One can omit the cage here. Depending on the direction of rotation, one of the two working areas activates functional segment A or functional segment B of clamping sleeve 70.

To increase the resistance to wear and tear, one can coat the friction surfaces of clutch hubs 22 and 23 with a wear-resistant material. The friction surfaces, for example, can be nitrocarbonated or can be provided with a molybdenum coating.

Figure 16:
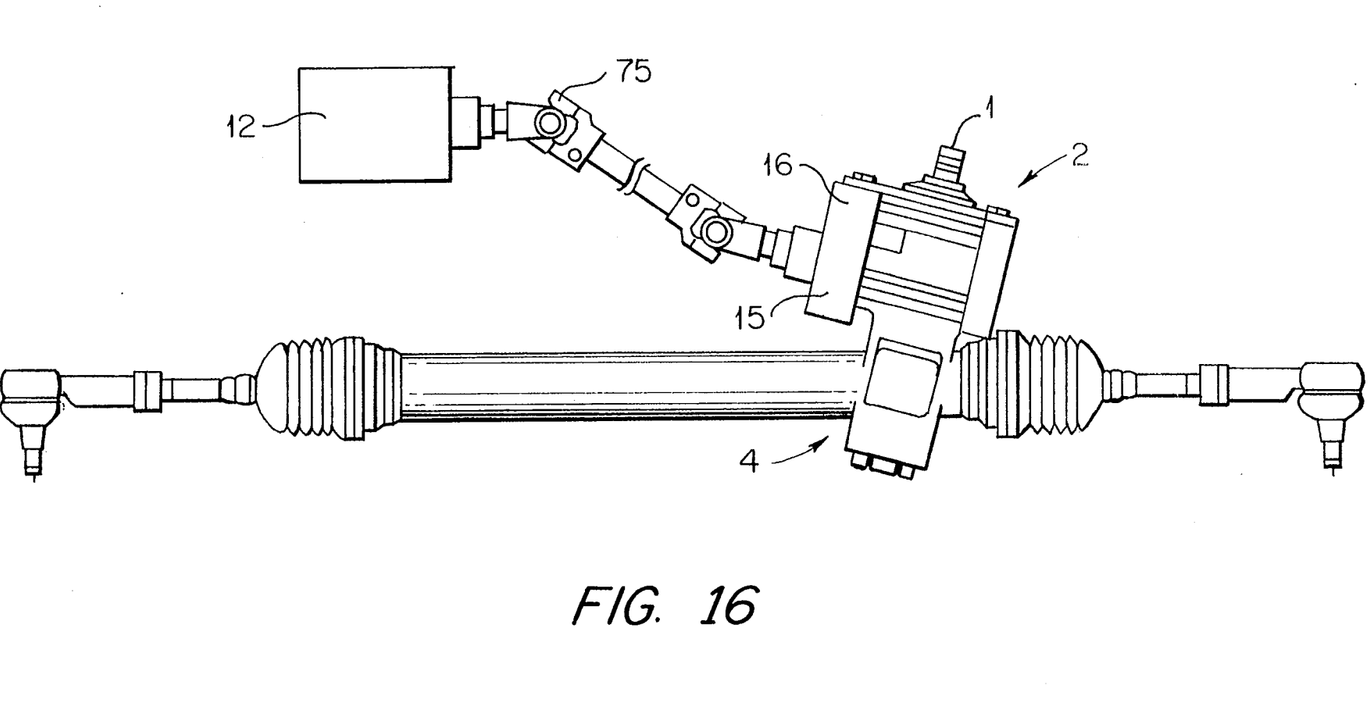
FIG. 16 shows the electric motion attached to the worm gear by a cardan shaft.
Figure 17:
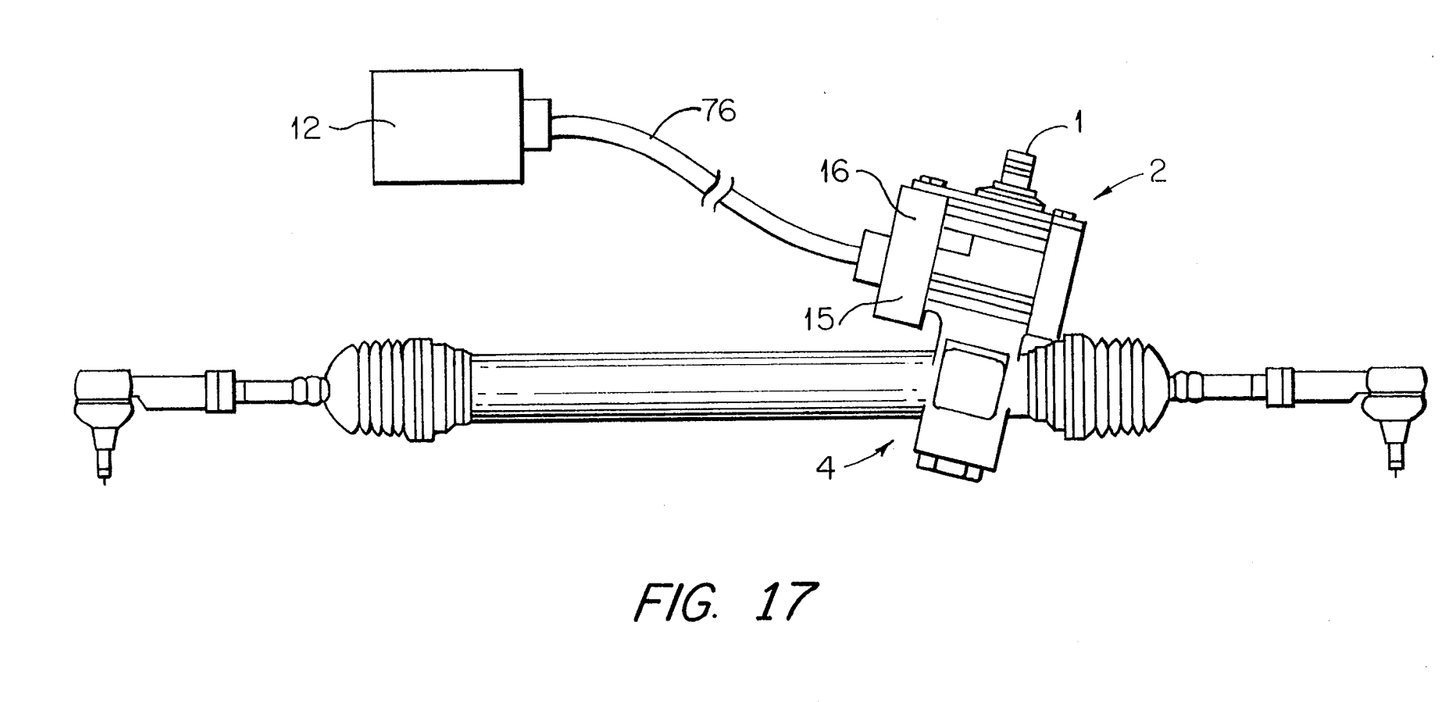
FIG. 17 shows the electric motor attached to the worm gear by a flexible draft.

If the installation conditions are particularly tight when the auxiliary power steering unit is built in, for example, in small cars, then electric motor 12 can be separated from the remaining structural unit (worm gears 16, clutch units 2, steering gear 4). Electric motor 12, for example, can be attached under the windshield along the splashboard or in a wheel housing and connection to the worm gear 16 can be established by a cardan shaft 75, as shown in FIG. 16 or a flexible shaft 76, as shown in FIG. 17.

It is within the context of the invention to build in a structural unit consisting of worm gear 16 and clutch devices 2 immediately under the manual steering wheel and to establish connection to steering gear 4 via a prolonged driven shaft 3.

Figure 15:
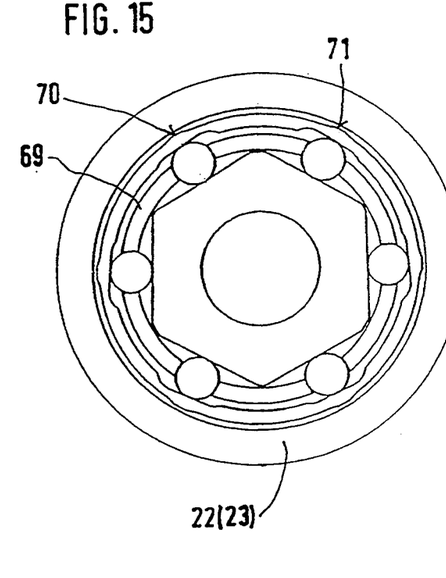
FIG. 15 is another version shown in a partial profile according to FIG. 4, but with additional axial bars along the friction surface of the clamping sleeve.

Another version according to FIG. 15 shows a clamping sleeve 69 with slits and associated roller bodies according to any of FIGS. 7 to 10 or 12. One essential difference, however, consists in the fact that the friction surface is provided with narrow, axially extending bars 70 or 71 in the area of the roll bodies. Depending on the steering direction, bars 70 or 71 will rest in corresponding functional segment A or B in the clutch hub 20 or 23 (FIG. 1). For reasons of production, bars 70 and 71 extend over the entire width of clamping sleeve 69. These bars have the property that they easily penetrate through the lubricant film and therefore facilitate temperature-independent power transmission.

By way of overload safety, the electric motor advantageously gets a temperature sensor that interrupts the power supply in case of excessive heating.

For reasons of energy savings, it is furthermore practical to turn the electric motor on only as of a certain low driving speed (for example, $v = < 10$ km/hr) so that the steering force support will take effect only at higher steering forces.

| Reference Symbols | |
|---|---|
| 1 | Steering spindle |
| 2 | Clutch unit |
| 3 | Driven shaft |
| 4 | Steering gear |
| 5 | Pinion |
| 6 | Rack |
| 7 | Press-on device |
| 8 | Spring |
| 9 | Catch |
| 10 | Roller bearing |
| 11 | Roller bearing |
| 12 | Electric motor |
| 13 | Spur wheel |
| 14 | Spur wheel |
| 15 | Worm gear |
| 16 | Worm gear |
| 17 | Pinion |
| 18 | Pinion |
| 19 | Radial roller bearing |
| 20 | Wheel |
| 21 | Wheel |
| 22 | Clutch hub |
| 23 | Clutch hub |
| 24 | Oblique bearing |
| 25 | Oblique bearing |
| 26 | Expansion bearing |
| 27 | Clamping sleeve |
| 28 | Clamping body |
| 29 | — |
| 30 | Clamping body |
| 31 | Cage |
| 32 | Running surface |
| 33 | — |
| 34 | Groove toothing |
| 35 | Clamping slope |
| 36 | Clamping slope |
| 37 | Rim of 27 |
| 38 | Lubricating grooves |
| 39 | Lubricating grooves |
| 40 | Slits |
| 41 | Slits |
| 42 | Slits |
| 43 | Clamping sleeve |
| 44 | Slits |
| 45 | Slits |
| 46 | Clamping body |
| 47 | Clamping body |
| 48 | Clamping sleeve |
| 49 | Clamping sleeve |
| 50 | U-shaped slits |
| 51 | Short legs |
| 52 | L-shaped slits |
| 53 | Clamping body |
| 54 | Clamping body |
| 55 | Slits |
| 56 | Slits |
| 57 | Clamping body |
| 58 | Clamping body |
| 59 | — |
| 60 | Clamping body (plates) |
| 61 | Clamping body |
| 62 | Impressions |
| 63 | Grooves |
| 64 | Clamping sleeve |

| -continued |
| --- |
| Reference Symbols |
| 65 Connecting bar |
| 66 Connecting bar |
| 67 Clamping slope |
| 68 Clamping slope |
| 69 Clamping sleeve |
| 70 Bar |
| 71 Bar |

We claim:

1. An auxiliary power steering unit for a motor vehicle comprising:
   a polygonal steering spindle (1) which is driven in rotation in both directions by a manual steering wheel of the vehicle;
   a steering gear (4);
   a driven shaft (3) which connects said steering spindle to said steering gear;
   an auxiliary drive source (12) which produces a torque, said drive source including first and second reducing gears (15, 16) which provide a torque for each direction of rotation of said steering spindle; and
   first and second clutch units (2) which establish a respective drive connection from a respective said reducing gear to said driven shaft, said clutch units including
      a common cage (31) for both respective said clutch units which is located radially about said polygonal steering spindle,
      first and second clamping bodies (28, 30) which are guided by said cage for rotation in both directions by contact with said polygonal steering spindle,
      a slitted clamping sleeve (27) which is divided into first and second functional segments (A, B) which said functional segments are respectively engaged with a respective one of said first and second clamping bodies (28, 30), and
      first and second clutch hubs (22, 23) within which said clamping sleeve is disposed with a gap (5) therebetween, said clutch hubs being oppositely driven in rotation by a respective one of said reducing gears whereby upon a steering movement of said polygonal steering spindle a respective one of said clamping bodies (28, 30) is moved radially to engage an associated functional segment (A, B) of said clamping sleeve (27) with an associated said clutch hub (22, 23) so that said clamping sleeve is correspondingly driven in rotation by said drive source thereby driving said driven shaft (3).

2. An auxiliary power steering unit as claimed in claim 1
   wherein said clamping sleeve (27) and has three rows of slits (40, 41, 42) thereabout;
   wherein there is a row of said first clamping bodies (28) and a row of said second clamping bodies (30), each of said rows of said clamping bodies working independently from one another,
      each said first and second clamping body of a respective said first and second row working together while engaging said polygonal steering spindle so as to be all moved radially by movement of said steering spindle; and
   wherein said slitted clamping sleeve (27) is a unitary element and includes
      first and second rows of slits (40, 41) which extend in a circumferential direction, in which said slits of each said row are aligned parallel and adjacent one another, and in which said first and second rows of slits are arranged with said first row of said first clamping bodies associated with said first functional segment (A) therebetween,
      a third row of slits (42) which extend in a circumferential direction, which are located between an outer rim (37) of said clamping sleeve (27) and an adjacent one of said first and second rows of slits, which has said slits of said third row parallel and staggered with respect to said slits of the adjacent one of said first and second rows of slits, and which is located with said second row of clamping bodies (30) associated with said second functional segment (B) between said third row of slits (42) and said outer rim (37), and
      respective first and second slopes (35, 36) which lie along an inside diameter of respective said first and second functional segments (A, B) of said clamping sleeve (27) and in between which said first and second slopes respective said first and second clamping bodies are disposed, said first and second slopes having inclination angles in opposite directions.

3. An auxiliary power steering unit as claimed in claim 2 wherein said row of said first clamping bodies (28) associated with said first functional segment (A) lie axially centered adjacent respective said slits of said first and second rows of slits (40, 41), and wherein said row of said second clamping bodies (30) associated with said second functional segment (B) lie axially centered adjacent respective said slits of said third row of slits (42).

4. An auxiliary power steering unit as claimed in claim 1 wherein said clamping sleeve (27) is bell shaped having a narrow end which engages about said driven shaft (3) with mutual grooved teeth and a wide end which extends about said steering spindle (1).

5. An auxiliary power steering unit as claimed in claim 1 wherein said clamping sleeve (27) includes first and second rows of slits (44, 45) which extend axially inward from opposite sides of said sleeve (27) and which are staggered with respect to one another, and wherein there are a plurality of said first and second clamping bodies (46, 47) which are respectively located axially adjacent inward ends of respective said slits of said first and second rows of slits (44, 45).

6. An auxiliary power steering unit as claimed in claim 1 wherein said first functional segment (A) of said clamping sleeve (48) includes U-shaped slits (50) having opposed legs extending in a circumferential direction and a plurality of said first clamping bodies (53) are respectively located between respective said opposed legs; and wherein said second functional segment (B) of said clamping sleeve (48) includes L-shaped slits (51) having short legs extending in an axial direction from a rim of said clamping sleeve (48) and a plurality of said second clamping bodies (54) are respectively located between respective said short legs and said rim.

7. An auxiliary power steering unit as claimed in claim 1 wherein said clamping sleeve (49) includes
   an outer rim; and
   first and second rows of slits (55, 56) which extend in a circumferential direction parallel to one another and with said slits of each row opposite one another, a plurality of said first clamping bodies (57)

being respectively arranged circumferentially between every other opposed pair of slits (55, 56) and a plurality of said second clamping bodies (58) being respectively arranged between said rim and the adjacent said row of slits and staggered with respect to adjacent said first clamping bodies.

8. An auxiliary power steering unit as claimed in claim 1
wherein said clamping bodies (60, 61) are formed as crowned clamping plates;
wherein said steering spindle (1) includes two common grooves (63) in which said crowned clamping plates are supported; and
wherein said clamping sleeve (64) includes impressions (62) in which said crowned clamping plates are obliquely received relative to a respective direction of action.

9. An auxiliary power steering unit as claimed in claim 1
wherein said clamping sleeve (70) includes first and second clamping slopes (67, 68) which are circumferentially oppositely directed and which are located in respective functional segments (A, B); and
wherein said first and second clamping bodies are formed as a unitary roller (71) which engages both said first and second clamping slopes.

10. An auxiliary power steering unit as claimed in claim 1 and further including a lubricant in which said clutch units (2) run.

11. An auxiliary power steering unit as claimed in claim 1 wherein said clutch units further include oblique bearings (24, 25) which position said clutch hubs (22, 23) for rotation and an expansion bearing (26) which eliminates any axial play between said clutch hubs.

12. An auxiliary power steering unit as claimed in claim 1 wherein said auxiliary drive source is an electric motor (12) which is housed separately from said clutch units (2) and which includes a worm gear (16) adjacent said clutch units and a cardan shaft (75) connecting said electric motor and said worm gear.

13. An auxiliary power steering unit as claimed in claim 1 wherein said auxiliary drive source is an electric motor (12) which is housed separately from said clutch units (2) and which includes a worm gear (16) adjacent said clutch units and a flexible shaft (76) connecting said electric motor and said worm gear.

14. An auxiliary power steering unit as claimed in claim 1 and further including roller bearings (10, 11) in which said steering spindle (1) and said driven shaft (3) are mounted for rotation and a spring (8) positioned between said steering spindle (1) and said driven shaft (8) to eliminate axial play therebetween.

15. An auxiliary power steering unit as claimed in claim 1 and further including lubricating grooves (38, 39) provided in a face of said clutch hubs (22, 23) adjacent said clamping sleeve (27).

16. An auxiliary power steering unit as claimed in claim 1 wherein said clutch hubs (22, 23) include a friction surface adjacent said clamping sleeve (27) which is coated with a wear-resistant material.

17. An auxiliary power steering unit as claimed in claim 1 wherein said clamping sleeve (69) includes axial bars (70, 71) on an outside surface thereof opposite to said clamping bodies (28, 30).

* * * * *